Patented Dec. 18, 1945

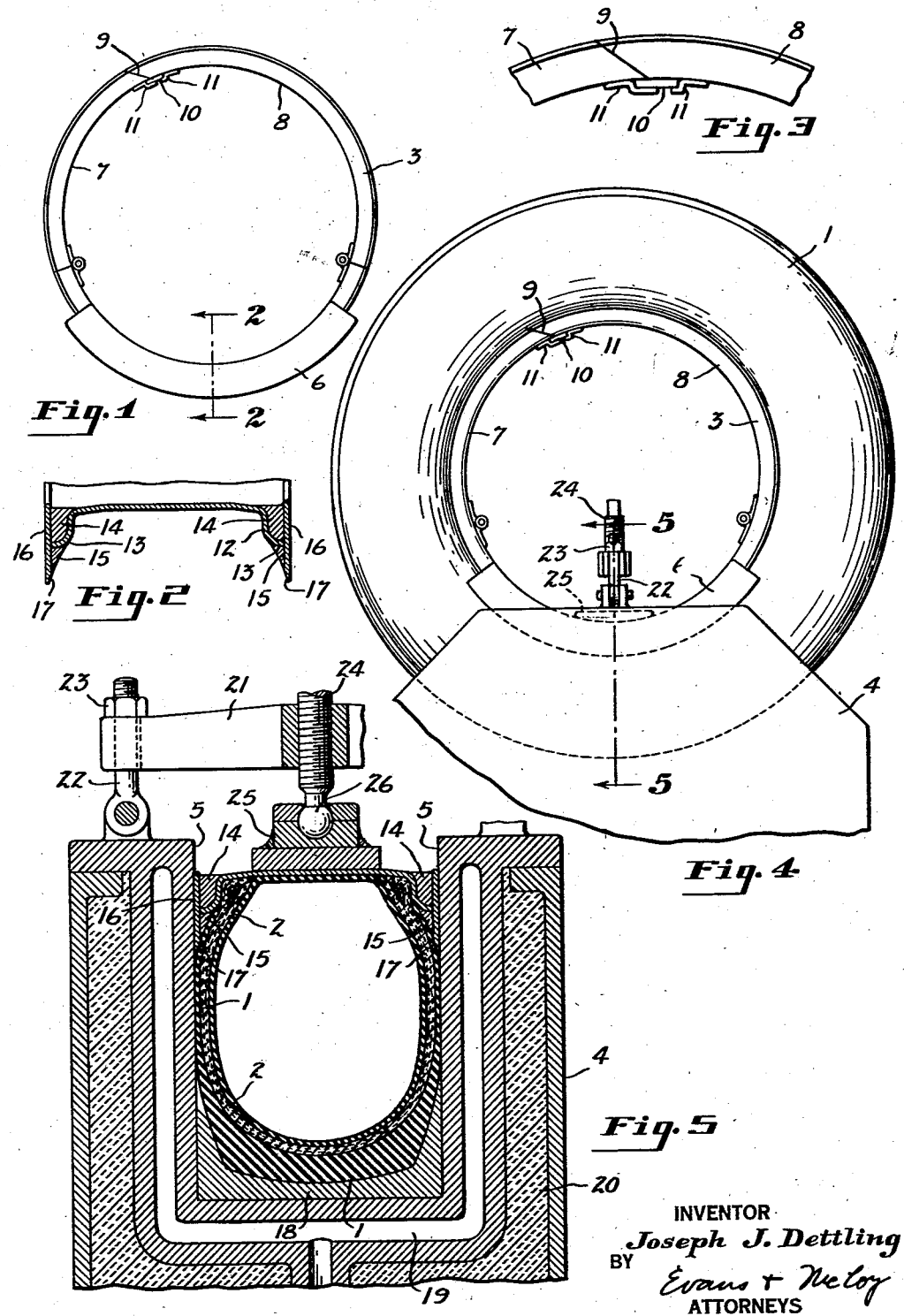

2,391,300

UNITED STATES PATENT OFFICE 2,391,300

APPARATUS FOR REPAIRING PNEUMATIC TIRE CASINGS

Joseph J. Dettling, Akron, Ohio, assignor to The General Tire & Rubber Company, Akron, Ohio, a corporation of Ohio Application July 2, 1943, Serial No. 493,184

1 Claim. (Cl. 18—18)

This invention relates to apparatus for repairing pneumatic tire casings by the vulcanization of raw rubber repair material applied to a portion of the casing.

Further objects of the invention are: to provide a tire mounting rim on which the tire casing can be quickly and easily mounted for inflation, to provide a rim that has a portion formed to fit in the channel of an arcuate vulcanizing mold, and to provide heat conducting spacing members between the side walls of the mold and bead portions of the tire to insure adequate heating of repair materials applied to bead portions of the tire.

With the above and other objects in view, the invention may be said to comprise the method of repairing tire casings and the apparatus as illustrated in the accompanying drawing hereinafter described and particularly set forth in the appended claim together with such variations and modifications thereof as will be apparent to one skilled in the art to which the invention pertains.

Reference should be made to the accompanying drawing forming part of this operation, in which:

Figure 1 is a side elevation of the collapsible rim upon which the tire is mounted for inflation during the vulcanizing operation.

Fig. 2 is a section taken on the line indicated at 2—2 in Fig. 1.

Fig. 3 is a side elevation on an enlarged scale showing the breakable joint and the lock for holding the rim in extended position.

Fig. 4 is a side elevation showing the tire with a segment thereof positioned in the vulcanizing mold.

Fig. 5 is a section taken on the line indicated at 5—5 in Fig. 4.

As shown in the accompanying drawing, a repaired tire casing 1 is assembled with an air bag or inner tube 2 and mounted for inflation on a supporting rim 3. For vulcanizing the repair a mold 4 is provided which is channel shaped in cross section, having parallel vertical side walls 5 adapted to receive a segment of the tire and rim between them.

In repairing tires by the present invention, the repair material is applied to the portion of the tire casing 1 that requires repair, an air bag or inner tube 2 is assembled in the casing which is then mounted for inflation upon the supporting rim 3. A segment of the tire and rim is then inserted into the open channel of the mold 4 with the portion of the tire containing the repair material confined between walls of the mold and the segment of the rim within the mold. The tire is then inflated and the mold is heated while the tire is held in place in the mold as shown in Fig. 5 so that the repair portion to be vulcanized is confined under pressure against the walls of the mold which are heated to vulcanize the repair material.

The portion of the tire within the mold is preferably confined to a width less than the normal width of the inflated tire so that the portion of the tire within the mold is distorted to a radially elongated oval form in radial cross section as shown in Fig. 5. The side walls of the tire are thus flattened against the parallel walls 5 of the mold and all of the side walls of the casing to the beads thereof are positioned close to the side walls of the mold so that heat may be transferred from the side walls to vulcanize repair material applied to bead portions of the tire casing as well as to the side wall and tread portions thereof.

During the vulcanizing operation, a heavy pressure may be uniformly exerted against the mold walls because of the fact that the tire casing is inflated and the amount of pressure is limited only by the strength of the tire casing itself, the difficulties of applying adequate pressure locally to the portion of the tire casing in the mold being thus avoided.

The rim 3 is preferably a segmental collapsible rim composed of hingedly connected segments. The rim has a segment 6 which is adapted to be inserted into the mold 4 and segments 7 and 8 which are hinged to the segment 6 and which have bevelled free ends which are adapted to abut to form a breakable joint 9. The rim is locked in extended position by means of a flat key 10 which is adapted to extend transversely across the interior of the rim bridging the joint 9, the locking key 10 being slidably guided between keeper lugs 11 welded to the adjacent ends of the segments 7 and 8. When collapsed, the rim 3 is adapted to be inserted within the opening of the tire casing. The segment 6 may be engaged with the proper portion of the tire and the segments 7 and 8 then swung into bead engaging positions with their bevelled ends in engagement. The rim is then locked in extended position by inserting the key 10 in place between the keeper lugs 11. The rim can be readily removed from the tire by removing the key 10 and collapsing the segments.

The rim 3 is provided with side flanges 12 of conventional form which have outwardly curved edge portions 13. Arcuate heat conducting filler strips 14 are welded to the outer faces of the flanges 12 inwardly of the curved portions 13 and additional filler strips 15 are welded to the outer faces of the curved portions 13 of the flanges, the latter strips having inclined inner faces shaped to conform to flaring portions of the tire adjacent the rim flanges. The outer faces of the filler strips 14 and 15 are flat and flush with the outer edges of the rim flanges. Relatively thin facing plates 16 are welded to the outer faces of the strips 14 and 15, the plates 16 projecting outwardly past the strips 15 and having bevelled edges 17 which form extensions of the flaring inner faces of the strips 15 and engage the tire outwardly of the strips 15. The strips 14 and 15 together with the facing plates 16 provide heat conducting fillers between the beads of the tire and the heated side walls of the mold so that heat adequate for vulcanization is transmitted to the bead portions of the tire casing so that repair material applied to the bead portions will be properly vulcanized.

The mold 4 has a bottom liner 18 which is shaped to conform to the tread of the tire 1. A steam chamber 19 is provided in the bottom and side walls of the mold 4 and this steam chamber extends to adjacent the top of the walls 5 and above the portion occupied by the beads of the tire casing when the casing is inserted in the mold. The mold walls are also provided with an insulation chamber 20 outside the steam chamber 19.

In order to securely hold the tire in the mold during the vulcanizing operation, the mold carries a cross-head 21 which extends across the open top of the mold channel and is connected at its ends to the top of the mold by suitable means such as eye bolts 22 which are pivoted at their lower ends to the mold and extend through openings in the ends of the cross-head. Nuts 23 on the bolts 22 serve to hold the cross-head 21 in place and may be adjusted to position the cross-head. The cross-head 21 carries a central vertical adjusting screw 24 which is in threaded engagement with the central portion of the cross-head and which carries a rim engaging head 25 connected by a ball joint 27 to the lower end thereof.

After the tire is placed in the mold, the cross-head 21 is secured in place across the open top of the mold above the segment 6 of the rim and pressure is applied to the rim 3 by means of the screw 24.

After the tire has been inserted into the mold and clamped in place by means of the cross-head 21 and screw 24, the tire is inflated to press all portions of the tire casing within the mold firmly against the confining portions of the mold and rim. By reason of fact that the channel of the mold is of a width only slightly greater than the width of the tire supporting rim, the side walls of the tire are flattened against the side walls of the mold by the inflation pressure and the tire is distorted radially to elongated oval form in radial cross section. By reason of the relatively narrow space in which the tire is confined, the beads of the tire are quite close to the heated side walls 5 of the mold, and since the spaces between the beads and side walls are filled by the heat conducting filler strips, repair material applied to the bead portions of the tire will be properly vulcanized.

The filler strips 14 and 15 and facing plates 16 are preferably of a length sufficient to extend past the portions of the mold side walls between which the rim segment is received. This extension of the filler segments is of advantage in that it prevents marring of the tire side walls by relieving the pressure against edges of the heated mold walls.

It is apparent that the present invention provides a rapid and economical means of effectively vulcanizing repair material in tire casings, that the repair material so vulcanized may be in any portion of the tire casing, and that adequate pressure is applied to the portion of the casing carrying the material being vulcanized.

It is to be understood that variations and modifications of the specific devices herein shown and described for purposes of illustration, may be made without departing from the invention as herein claimed.

What I claim is:

A rim for supporting a pneumatic tire for repair vulcanization having side flanges that have outwardly curved outer portions, said rim being collapsible and composed of a series of segments hingedly connected end to end, one of the segments of said rim being a mold closing segment and having inner filler strips welded to the outer faces of its flanges inwardly of the outwardly curved portions thereof, and outer filler strips welded to the outer faces of said curved portions of the flanges, said filler strips having flat faces flush with the edges of said flanges, and flat arcuate facing plates overlying the outer faces of said strips and the outer edges of said flanges and welded thereto.

JOS. J. DETTLING.